US012631516B2

(12) United States Patent
Li et al.

(10) Patent No.: US 12,631,516 B2
(45) Date of Patent: May 19, 2026

(54) SYSTEMS AND METHODS FOR TUNING RESONATORS FOR ENHANCED SENSITIVITY

(71) Applicant: Toyota Motor Engineering & Manufacturing North America, Inc., Plano, TX (US)

(72) Inventors: Xiaopeng Li, Ann Arbor, MI (US); Taehwa Lee, Ann Arbor, MI (US); Ziqi Yu, Ann Arbor, MI (US); Yuyang Song, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 371 days.

(21) Appl. No.: 18/133,135

(22) Filed: Apr. 11, 2023

(65) Prior Publication Data

US 2024/0280432 A1 Aug. 22, 2024

Related U.S. Application Data

(60) Provisional application No. 63/447,489, filed on Feb. 22, 2023.

(51) Int. Cl.
G01M 7/02 (2006.01)
G01L 9/00 (2006.01)
(Continued)

(52) U.S. Cl.
CPC .......... G01M 7/025 (2013.01); G01L 9/0022 (2013.01); G01L 9/06 (2013.01); G01L 9/08 (2013.01); G01L 17/00 (2013.01)

(58) Field of Classification Search
CPC . G01L 9/0022; G01L 9/06; G01L 9/08; G01L 17/00; G01M 7/025
(Continued)

(56) References Cited

U.S. PATENT DOCUMENTS 3,609,593 A * 9/1971 Boll ......................... H03H 9/24
310/306
4,492,246 A 1/1985 Prescott et al.
(Continued)

FOREIGN PATENT DOCUMENTS

CN 208254930 U * 12/2018
DE 102016105803 A1 * 10/2017 ............... G01L 9/16
(Continued)

OTHER PUBLICATIONS

Translate_JP2002070933 (Year: 2002).*
(Continued)

*Primary Examiner* — Peter J Macchiarolo
*Assistant Examiner* — Monica S Young
(74) *Attorney, Agent, or Firm* — Christopher G. Darrow; Darrow Mustafa PC

(57) ABSTRACT

System, methods, and other embodiments described herein relate to tuning a mechanical resonator for detecting a significant value using an electrical resonator that enhances sensitivity. In one embodiment, a system includes a mechanical resonator having a beam coupled to a body. The system also includes an electrical resonator coupled through a patch to the mechanical resonator, the electrical resonator operating as a shunt and having an inductor and a resistor (LR) circuit in series. The system also includes the electrical resonator that detects, associated with a perturbation of the body, an exceptional point (EP) of the mechanical resonator by varying the LR circuit according to a model.

20 Claims, 6 Drawing Sheets

(51) Int. Cl.
    *G01L 9/06*          (2006.01)
    *G01L 9/08*          (2006.01)
    *G01L 17/00*        (2006.01)

(58) Field of Classification Search
    USPC ........................................................ 73/579
    See application file for complete search history.

(56) References Cited

U.S. PATENT DOCUMENTS

| | | | |
|---|---|---|---|
| 5,499,526 A | 3/1996 | Muro | |
| 6,134,964 A * | 10/2000 | Jaenker | B06B 1/0261 |
| | | | 73/514.36 |
| 6,954,686 B2 * | 10/2005 | Aubourg | F16F 7/10 |
| | | | 701/3 |
| 7,358,503 B2 | 4/2008 | Fellerman et al. | |
| 7,551,058 B1 | 6/2009 | Johnson et al. | |
| 8,354,778 B2 * | 1/2013 | Arnold | H02K 7/1892 |
| | | | 310/370 |
| 9,411,029 B2 | 8/2016 | Pirkl | |
| 9,601,266 B2 * | 3/2017 | Karalis | H02J 50/12 |
| 9,933,503 B2 | 4/2018 | Vernickel et al. | |
| 10,284,176 B1 | 5/2019 | Solal | |
| 10,717,672 B2 | 7/2020 | Loh et al. | |
| 10,724,994 B2 | 7/2020 | Van Tooren et al. | |
| 11,022,561 B2 | 6/2021 | Ziehl | |
| 11,162,972 B2 | 11/2021 | Abdolvand et al. | |
| 2009/0301176 A1 * | 12/2009 | Rowe | G01L 9/0052 |
| | | | 310/314 |
| 2011/0107838 A1 | 5/2011 | Suijlen et al. | |
| 2014/0053651 A1 | 2/2014 | Besling et al. | |
| 2014/0062256 A1 * | 3/2014 | Buss | H02N 2/188 |
| | | | 310/319 |
| 2015/0308911 A1 | 10/2015 | Pechstedt et al. | |
| 2015/0338380 A1 | 11/2015 | Ziehl et al. | |
| 2017/0115382 A1 | 4/2017 | Koudar et al. | |
| 2018/0062062 A1 * | 3/2018 | de Bonfim Gripp | F16F 15/005 |
| 2018/0107015 A1 | 4/2018 | Dümpelmann et al. | |
| 2019/0028084 A1 * | 1/2019 | Yoon | G01H 1/06 |
| 2022/0051650 A1 | 2/2022 | Lee et al. | |
| 2022/0057440 A1 * | 2/2022 | Capolino | G01R 23/02 |
| 2022/0190231 A1 | 6/2022 | Li et al. | |
| 2022/0214312 A1 | 7/2022 | Lee et al. | |
| 2022/0285604 A1 | 9/2022 | Li et al. | |
| 2024/0371349 A1 | 11/2024 | Li et al. | |
| 2024/0371350 A1 | 11/2024 | Li et al. | |
| 2024/0372530 A1 * | 11/2024 | Li | H03H 9/02015 |

FOREIGN PATENT DOCUMENTS

| | | | | |
|---|---|---|---|---|
| EP | 1531372 A1 * | 5/2005 | | G05B 5/01 |
| EP | 4477915 A1 * | 12/2024 | | F16F 15/002 |
| JP | 2002070933 A * | 3/2002 | | |
| WO | 2013076270 A1 | 5/2013 | | |
| WO | 2016081915 A1 | 5/2016 | | |

OTHER PUBLICATIONS

Wang et al., "Multi-resonant piezoelectric shunting induced by digital controllers for subwavelength elastic wave attenuation in smart metamaterial," Smart Materials and Structures, vol. 26, No. 2, 2017, pp. 1-20.

Li et al., "A self-adaptive metamaterial beam with digitally controlled resonators for subwavelength broadband flexural wave attenuation," Smart Materials and Structures, vol. 27, No. 4, 2018, pp. 1-13.

Gripp et al., "Vibration and noise control using shunted piezoelectric transducers: A review," Mechanical Systems and Signal Processing, vol. 112, Nov. 2018, pp. 359-383.

Chen et al., "Elastic-electro-mechanical modeling and analysis of piezoelectric metamaterial plate with a self powered synchronized charge extraction circuit for vibration energy harvesting," Mechanical Systems and Signal Processing vol. 143, Sep. 2020, pp. 1-27.

Nassar et al., "Nonreciprocity in acoustic and elastic materials," Nature Reviews Materials, vol. 5, Iss. 9, 2020, pp. 667-685.

Sugino et al., "Nonreciprocal piezoelectric metamaterial framework and circuit strategies," Physical Review B 102 (1), 2020, 7 pages.

Wu et al., "Asymmetric scattering of flexural waves in a parity-time symmetric metamaterial beam," The Journal of the Acoustical Society of America, vol. 146, Iss. 1, 2019, pp. 850-862.

Doppler et al., "Dynamically encircling an exceptional point for asymmetric mode switching," Nature, vol. 537, 2016, pp. 76-79.

Zhang et al., "Dynamically encircling exceptional points: in situ control of encircling loops and the role of the starting point," Physical Review X, vol. 8, Iss. 2, Apr. 2018, pp. 1-18.

A. Preumont et al., "Vibration control of active structures: an introduction," 3rd edition, vol. 246, Springer, 2018, 202 pages.

Tang et al., "Active-passive hybrid piezoelectric networks for vibration control: comparisons and improvement," Smart Materials and Structures, vol. 10, No. 4, 2001, pp. 794-806.

Neubauer et al., "Vibration damping with shunted piezoceramics: fundamentals and technical applications," Mechanical Systems and Signal Processing, vol. 36, Iss. 1, 2013, pp. 36-52.

Haus et al., "Waves and fields in optoelectronics," Prentice-Hall, Inc., Englewood Cliffs, NJ, 1984, 402.

Fan et al., "Temporal coupled-mode theory for the fano resonance in optical resonators," JOSA A, vol. 20, Iss. 3, 2003, pp. 569-572.

Zhang et al., "A metamaterial beam with inverse nonlinearity for broadband micro-vibration attenuation," Mechanical Systems and Signal Processing, vol. 159, Oct. 2021, pp. 1-13.

Allik et al., "Finite element method for piezoelectric vibration," International journal for numerical methods in engineering, vol. 2, Iss. 2, 1970, pp. 151-157.

Leng et al., "Limits of flexural wave absorption by open lossy resonators: reflection and transmission problems," New Journal of Physics, vol. 21, May 2019, pp. 1-11.

Li et al., "An active meta-layer for optimal flexural wave absorption and cloaking," Mechanical Systems and Signal Processing, vol. 149, Feb. 15, 2021, pp. 1-35.

Hsu et al., "Bound states in the continuum," Nature Reviews Materials 1, article No. 16048, 2016, pp. 1-13.

Li et al. "Observation of an exceptional point with an LR-shunted resonator," Mechanical Systems and Signal Processing, vol. 196, Aug. 1, 2023, pp. 1-25.

Li et al. "Experimental study of a tunable perfect flexural wave absorber with a piezoelectric shunted resonator," Frontiers in Physics, vol. 10, Dec. 13, 2022, pp. 1-7.

Wu et al., "Asymmetric scattering of flexural waves in a parity-time symmetric metamaterial beam," The Journal of the Acoustical Society of America, vol. 146, 2019, pp. 850-862.

Schipf et al., "Tunable piezoelectric metamaterial for Lamb waves using periodic shunted circuits," arXiv:2207.07845v1, Jul. 16, 2022, pp. 1-30.

Zhao et al., "Numerical analysis of effective refractive index ultrasonic sensor based on Cantilever arm structure slot-based dual-micro-ring resonator," International Journal of Modern Physics B, vol. 35, No. 4, 2021, pp. 1-15.

Durdaut et al., "Phase Sensitivity and Phase Noise of Cantilever-Type Magnetoelastic Sensors Based on the ΔE Effect," arXiv:2003.01085v1, Mar. 2, 2020, pp. 1-15.

Casadei et al., "Piezoelectric resonator arrays for tunable acoustic waveguides and metamaterials," Journal of Applied Physics, vol. 112, 2012, pp. 1-6.

Casadei et al., "Broadband vibration control through periodic arrays of resonant shunts: experimental investigation on plates," Smart Materials and Structures, vol. 19, No. 1, 2010, pp. 1-13.

Cardella et al., "Manipulating waves by distilling frequencies: a tunable shunt-enabled rainbow trap," Smart Materials and Structures, vol. 25, 2016, pp. 1-15.

Jain et al., "Emerging Ideas in Nanocantilever based Biological Sensors," arXiv:1305.5729, 2013, pp. 1-17.

Airoldi et al., "Design of tunable acoustic metamaterials through periodic arrays of resonant shunted piezos," New Journal of Physics, vol. 13, Nov. 2011, pp. 1-21.

Chen et al., "Exceptional points enhance sensing in an optical microcavity," Nature, vol. 548, 2017, pp. 192-196.

(56) References Cited

OTHER PUBLICATIONS

Su et al., "Research on damage visualization of concrete structures based on electrical resistance tomography," Frontiers in Physics, 2022, pp. 1-12.

Ashida et al., "Non-Hermitian physics," Advances in Physics 69 (3) (2020), pp. 249-435.

Guo et al., "Observation of PT-symmetry breaking in complex optical potentials," Physical review letters, vol. 103, Iss. 9, 2009, 4 pages.

Lee et al., "Topolectrical circuits," Communications Physics 1 (1), 2018, pp. 1-9.

Yoshida et al., "Exceptional rings protected by emergent symmetry for mechanical systems," Physical Review B, vol. 100, Iss. 5, 2019, pp. 1-17.

Fleury et al., "An invisible acoustic sensor based on parity-time symmetry," Nature communications 6 (1), 2015, pp. 1-7.

Zangeneh-Nejad et al., "Active times for acoustic metamaterials," Reviews in Physics, vol. 4, Nov. 2019, pp. 1-17.

Ding et al., "Emergence, coalescence, and topological properties of multiple exceptional points and their experimental realization," Physical Review X, vol. 6, Iss. 2, 2016, 13 pages.

Gear et al., "Unidirectional zero reflection as gauged parity-time symmetry," New Journal of Physics, vol. 19, Iss. 12, 2017, pp. 1-10.

Lin et al., "Unidirectional invisibility induced by p t-symmetric periodic structures," Physical Review Letters, vol. 106, Iss. 21, 2011, pp. 1-4.

Li et al., "Experimental demonstration of extremely asymmetric flexural wave absorption at the exceptional point," Extreme Mechanics Letters, vol. 52, Apr. 2022, pp. 1-6.

Wang et al., "Extremely asymmetrical acoustic metasurface mirror at the exceptional point," Physical review letters, vol. 123, Iss. 21, Nov. 2019, pp. 1-5.

Hodaei et al., "Enhanced sensitivity at higher-order exceptional points," Nature, vol. 548 (7666), Aug. 2017, pp. 187-191.

Assawaworrarit et al., "Robust wireless power transfer using a nonlinear parity-time-symmetric circuit," Nature, vol. 546 (7658), Jun. 2017, pp. 387-390.

Peng et al., "Parity-time-symmetric whispering-gallery microcavities," Nature Physics, vol. 10, Iss. 5, May 2014, pp. 394-398.

Yi et al., "Asymmetric viscoelastic metamaterials for broad bandgap design and unidirectional zero reflection," Mechanical Systems and Signal Processing, vol. 162, Jan. 2022, pp. 1-15.

Wang et al., "Coherent perfect absorption at an exceptional point," Science, vol. 373, Iss. 6560, Sep. 2021, pp. 1261-1265.

Sweeney et al., "Perfectly absorbing exceptional points and chiral absorbers," Physical review letters, vol. 122, Iss. 9, Mar. 2019, pp. 1-6.

Zhu et al., "Simultaneous observation of a topological edge state and exceptional point in an open and non-Hermitian acoustic system," Physical review letters, vol. 121, Iss. 12, Sep. 2018, pp. 1-14.

Liu et al., Willis metamaterial on a structured beam, Physical Review X, vol. 9, Iss. 1, 2019, pp. 1-21.

Domínguez-Rocha et al., "Environmentally induced exceptional points in elastodynamics," Physical Review Applied 13 (1), 2020, pp. 1-8.

Cummer et al., "Controlling sound with acoustic metamaterials," Nature Reviews Materials, vol. 1, Iss. 3, Mar. 2016, pp. 1-13.

Chen et al., "A review of tunable acoustic metamaterials," Applied Sciences, vol. 8, Iss. 9, 2018, pp. 1-21.

Ji et al., "Recent progress in acoustic metamaterials and active piezoelectric acoustic metamaterials—a review," Applied Materials Today, vol. 26, Mar. 2022, pp. 1-28.

Popa et al., "Non-reciprocal and highly nonlinear active acoustic metamaterials," Nature communications, vol. 5, Iss. 1, 2014, pp. 1-5.

Popa et al., "Active acoustic metamaterials reconfigurable in real time," Physical Review B, vol. 91, Iss. 22, 2015, pp. 1-7.

Akl et al., "Analysis and experimental demonstration of an active acoustic metamaterial cell," Journal of Applied Physics, vol. 111, Iss. 4, 2012, 9 pages.

Chen et al., "An active mechanical willis meta-layer with asymmetric polarizabilities," Nature communications, vol. 11 Iss. 1, 2020, pp. 1-8.

Li et al., "Shaping elastic wave mode conversion with a piezoelectric-based programmable meta-boundary," Extreme Mechanics Letters, vol. 39, Sep. 2020, pp. 1-18.

Li et al., "An active meta-layer for optimal flexural wave absorption and cloaking," Mechanical Systems and Signal Processing, vol. 149, Feb. 2021, pp. 1-35.

Chen et al., "Realization of active metamaterials with odd micropolar elasticity," Nature communications, vol. 12, Iss. 1, 2021, pp. 1-12.

Li et al., "Acoustic metamaterials capable of both sound insulation and energy harvesting," Smart Materials and Structures, vol. 25, No. 4, 2016, pp. 1-5.

Airoldi et al., "Design of tunable acoustic metamaterials through periodic arrays of resonant shunted piezos," New Journal of Physics, vol. 13, Iss. 11, Nov. 2011, pp. 1-21.

Thomes et al., "Space-time wave localization in electromechanical metamaterial beams with programmable defects," Mechanical Systems and Signal Processing, vol. 167, Part B, Mar. 2022, pp. 1-16.

Trainiti et al., "Time-periodic stiffness modulation in elastic metamaterials for selective wave filtering: theory and experiment," Physical review letters, vol. 122, Iss. 12, Mar. 2019, 17 pages.

Chen et al., "Enhanced flexural wave sensing by adaptive gradient-index metamaterials," Scientific reports, vol. 6, Iss. 1, 2016, pp. 1-11.

Zhu et al., "Experimental study of an adaptive elastic metamaterial controlled by electric circuits," Applied Physics Letters, vol. 108, Iss. 1, 2016, 6 pages.

Hu et al., "Metamaterial beam with graded local resonators for broadband vibration suppression," Mechanical Systems and Signal Processing, vol. 146, Jan. 2021, pp. 1-20.

Yi et al., "Programmable metamaterials with digital synthetic impedance circuits for vibration control," Smart Materials and Structures, vol. 29, No. 3, 2020, pp. 1-21.

Sugino et al., "Digitally programmable resonant elastic metamaterials," Physical Review Applied, vol. 13, Iss. 6, 2020, 5 pages.

* cited by examiner

202

204

SYSTEMS AND METHODS FOR TUNING RESONATORS FOR ENHANCED SENSITIVITY

CROSS-REFERENCE TO RELATED APPLICATIONS

This application claims the benefit of U.S. Provisional Application No. 62/447,489, filed on, Feb. 22, 2023, which is herein incorporated by reference in its entirety.

TECHNICAL FIELD

The subject matter described herein relates, in general, to electro-mechanical resonators, and, more particularly, to a system tuning a mechanical resonator for detecting a significant value using an electrical resonator that enhances sensitivity.

BACKGROUND

Systems use resonators to detect precise frequencies for sensing, signal manipulation, and other applications. For example, vehicles use sensors that facilitate perceiving other vehicles, obstacles, pedestrians, and additional aspects of a surrounding environment. A vehicle equipped with a light detection and ranging (LIDAR) sensor can use light to scan the surrounding environment, while logic associated with the LIDAR analyzes acquired data to detect the presence of objects and other features of the surrounding environment. As such, sensor data can be useful in various circumstances for improving perceptions of the surrounding environment so that systems such as automated driving systems can perceive the noted aspects and accurately plan and navigate accordingly. However, perception accuracy and reliability depend upon sensor sensitivity.

In various implementations, variances caused by an operating environment distort resonator (e.g., optical, acoustic, etc.) responses and degrade sensitivity. Sometimes, the variance is a perturbation (e.g., a deformation, shock, excessive temperatures, etc.) on a body (e.g., a vehicle body) having a sensor that measures the perturbation using the resonator. A perturbation affects the frequency response of the resonator. Furthermore, tuning the resonator becomes more complex from the perturbation or variance. As such, a sensor using the resonator generates data having diminished reliability. Accordingly, systems using resonators have diminished sensitivity from external and internal phenomena associated with various applications.

SUMMARY

In one embodiment, example systems and methods relate to tuning a mechanical resonator for detecting a significant value using an electrical resonator that enhances sensitivity. In various implementations, a resonator encountering perturbations (e.g., a deformation, shock, excessive temperatures, resistance, etc.) in a system (e.g., a sensor system) causes a frequency distortion of resonance proportional to the strength of the perturbation. The frequency distortion can cause frequency splitting, shifts, and so on for the frequency response of the resonator. As such, perturbations and other distortions causing complex frequency responses of a resonator impact system reliability, particularly for sensors. Therefore, in one embodiment, a system includes a mechanical resonator coupled to a body (e.g., a vehicle body, rigid structure, etc.) for detecting a perturbation with an electrical resonator patched to the mechanical resonator. Here, the electrical resonator may have an inductor and a resistor (LR) circuit in series that shunts the mechanical resonator. Furthermore, the electrical resonator detects, the exceptional point (EP) of the mechanical resonator by varying the LR-circuit according to a model. The EP may represent an operating point of a resonator with improved sensitivity from the resonator encountering spectral distortions (e.g., frequency splitting). In one approach, the model follows a complex-square-root function for operating at the EP and factors frequency distortion scaling as a square-root of a perturbation strength instead of linearly. Accordingly, the system improves sensitivity for a mechanical resonator through detection at a EP using an electrical resonator and the model having a square-root relationship.

In one embodiment, a system that tunes a mechanical resonator for detecting a significant value using an electrical resonator that enhances sensitivity is disclosed. The system includes a mechanical resonator having a beam coupled to a body. The system also includes an electrical resonator coupled through a patch to the mechanical resonator, the electrical resonator operating as a shunt and having a LR circuit in series. The system also includes the electrical resonator that detects, associated with a perturbation of the body, an EP of the mechanical resonator by varying the LR circuit according to a model.

In one embodiment, a system that tunes a mechanical resonator for detecting a significant value using an electrical resonator that enhances sensitivity is disclosed. The system includes a mechanical resonator having a flexible beam coupled to a body. The system also includes an electrical resonator coupled through a patch to the mechanical resonator, the electrical resonator shunting the mechanical resonator and having a LR circuit in series. The system also includes that the electrical resonator controls frequency detuning near an EP of the mechanical resonator by controlling the LR circuit according to a model.

In one embodiment, a sensor that tunes a mechanical resonator for detecting a significant value using an electrical resonator that enhances sensitivity is disclosed. The sensor includes a mechanical resonator having a flexible beam coupled to a body. The sensor also includes an electrical resonator coupled through a piezoelectric device to the mechanical resonator, the electrical resonator shunting the mechanical resonator through a LR circuit in series. The sensor also includes that the electrical resonator measures, associated with a shock of the body, frequency detuning near an EP of the mechanical resonator by controlling the LR circuit according to a non-linear model.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the tuning of a mechanical resonator for detecting a significant value using an electrical resonator that enhances sensitivity are disclosed herein. In various implementations, resonators operating in a system for encountering or factoring perturbations (e.g., shock, impact, stress, temperature, resistance, etc.) face difficulties from spectral distortions. For example, a mechanical resonator implemented in a sensor system for detecting cracks on a vehicle component is substantially interrupted by a speed bump. As such, the sensor system generates erroneous and imprecise measurements that reduce operational robustness and safety. Therefore, in one embodiment, a system uses an electrical resonator that shunts a mechanical resonator coupled to a body for operating at an exceptional point (EP), thereby enhancing sensitivity when encountering perturbations. The EP may represent an operating point of the system that sustains sensitivity while avoiding spectral distortions (e.g., frequency splitting). In particular, the EP may be a point where eigenfrequencies and eigenstates coalesce and intersect. As such, this favorably leads to unidirectional effects (e.g., near-zero reflection), robust absorption, and enhanced higher-order sensitivities. Furthermore, the mechanical resonator may comprise an elastic material, aluminum, nano-resonator, and so on that senses or excites the body according to the perturbations while containing frequency distortion. In this way, the system utilizes the mechanical and electrical resonators with less complexity for EP operation.

Moreover, the system may use the electrical resonator for tuning by varying an inductor and a resistor (LR) circuit to detect the EP associated with a perturbation. The LR-circuit can be coupled to the mechanical resonator through a patch, such as a piezoelectric material having a stable and enhanced frequency transference from the mechanical resonator. In one approach, the system follows a model where a square-root dependence on resistance relates to the perturbation for eigenfrequency analysis. In particular, the system derives a peak of a splitting frequency from the square-root dependence and adjusts the resistance until the peaks intersect at the EP. Here, the frequency splitting may scale as a square-root of a strength associated with the perturbation. Accordingly, the system combines mechanical and electrical resonators for operating at the EP and detecting perturbations through tuning, thereby enhancing sensitivity and robustness from spectral distortions.

Figures 1A, 1B:
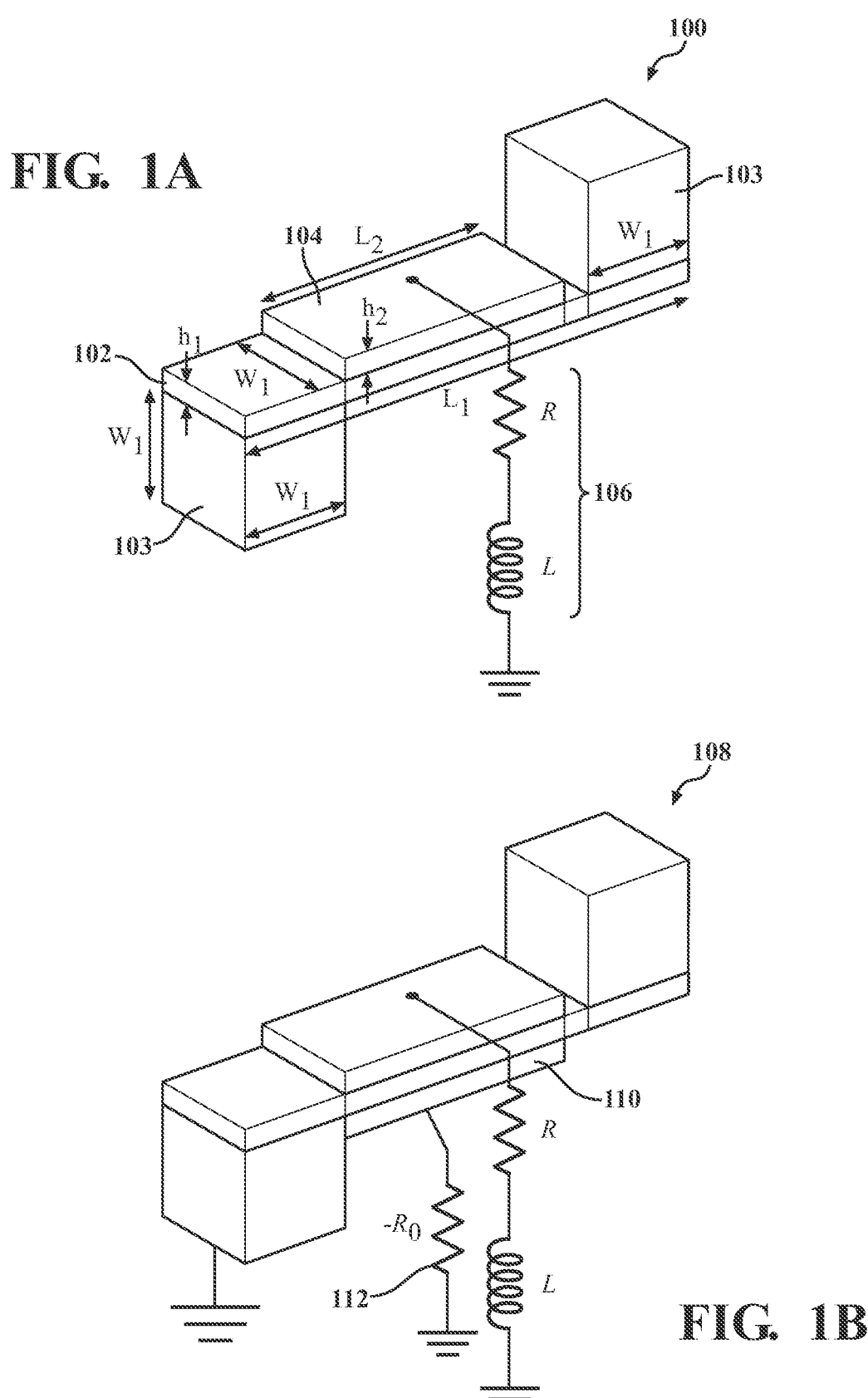
FIGS. 1A and 1B illustrate embodiments of a system having a mechanical resonator that is shunted by an electrical resonator for exceptional point (EP) operation.

FIGS. 1A and 1B illustrate embodiments of a system having a mechanical resonator that is shunted by an electrical resonator for EP operation. In one approach, the system uses the mechanical resonator as a sensor (e.g., a temperature sensor, ultrasonic sensor, stress sensor, etc.) for a vehicle that detects structural changes in an operating environment encountering perturbations. A vehicle may be any form of motorized transport including an automobile. A structural change can be caused by a road hazard, a component defect, and so on. Besides sensor applications, the system can be implemented as an active device (e.g., waveguide) that enhances sensitivity through leveraging EP operation associated with external stimuli.

In FIG. 1A, the system 100 includes a beam 102 with masses at the tip associated with the body structures 103. The beam may be one of an elastic material, aluminum, a micro-resonator, a nano-resonator, and so on that senses perturbations (e.g., excessive vibration) or causes changes (e.g., a waveguide) to the body structures 103. Materials may be engineered structures that interact with electromagnetic radiation depending upon the application. Furthermore, the body structures 103 are part of a host (e.g., a casing of a vehicle battery, a metamaterial shell, etc.) and the system 100 senses changes (e.g., cracks, excessive heat, etc.) from perturbations on the host. In one approach, as explained below, the system 100 has electrodes coupled to a battery casing and resistance R changes indicate a crack that is detected with enhanced sensitivity through EP operation.

In various implementations, the system 100 operates as a cantilever where opposite forces against the ends of the beam 102 are sensed by another system. Moreover, a patch 104 on the beam 102 couples the LR-circuit 106 for shunting. The patch 104 can be one of a piezoelectric material for stable and enhanced transference of frequencies between the beam 102 and the LR-circuit 106.

Figure 2A:
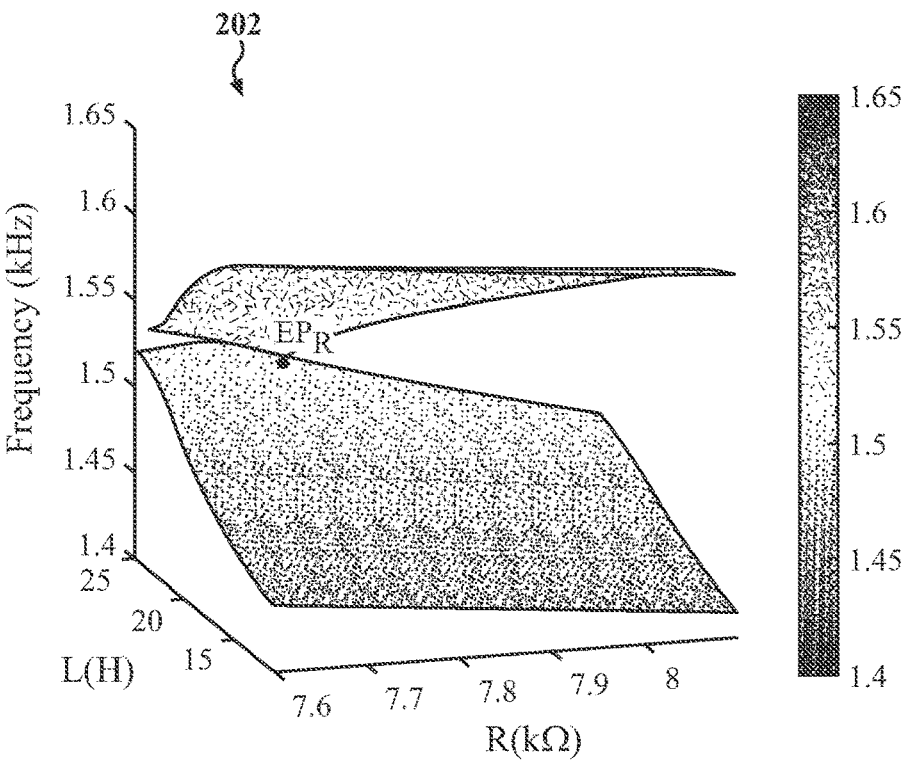
FIGS. 2A and 2B illustrate examples of varying an inductance and a resistor (LR) circuit of the electrical resonator such that eigenfrequencies intersect at an EP.
Figure 2B:
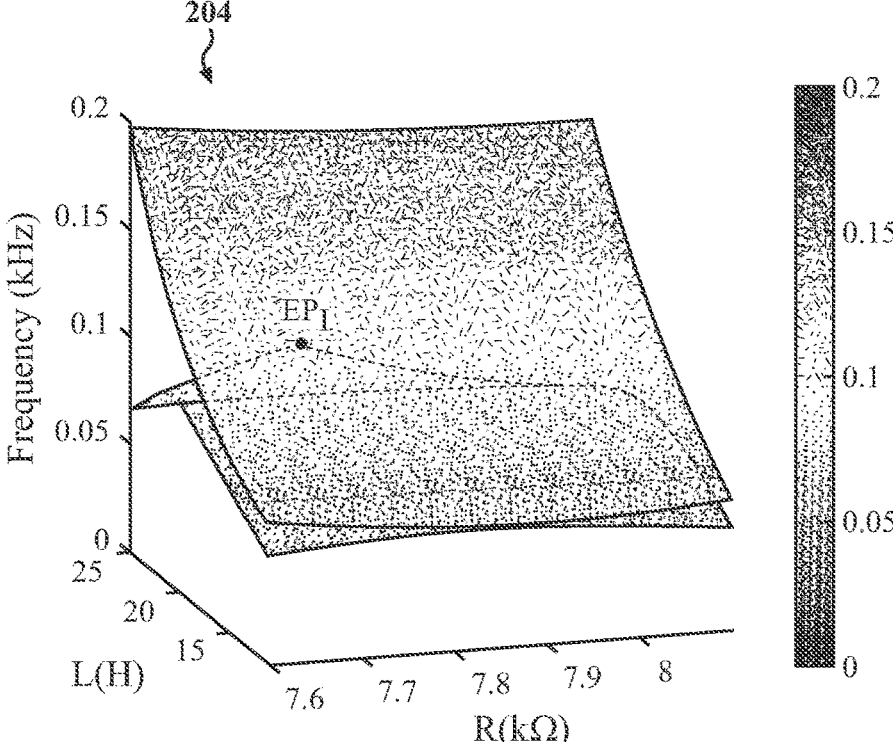

In system 100, the beam 102 may represent a mechanical resonator and the patch 104 and LR-circuit 106 an electrical resonator. As explained below, observing frequency characteristics or operating the system 100 at the EP through varying the LR-circuit 106 improves sensitivity. For example, the values of resistor R can reflect host temperature when linearly varied having increased sensitivity within the EP. FIGS. 2A and 2B illustrate examples of a system varying an LR-circuit such that eigenfrequencies intersect at an $EP_R$ and $EP_I$. An eigenfrequency may be a frequency where the system 100 naturally oscillates in the absence of driving forces. FIG. 2A represents real eigenfrequencies as functions of L and R and FIG. 2B imaginary eigenfrequencies through graphs 202 and 204. As explained below, eigenanalysis efficiently derives $EP_R$ and $EP_I$ for optimizing the operation of the mechanical resonator through shunting with the electrical resonator.

Figure 3:
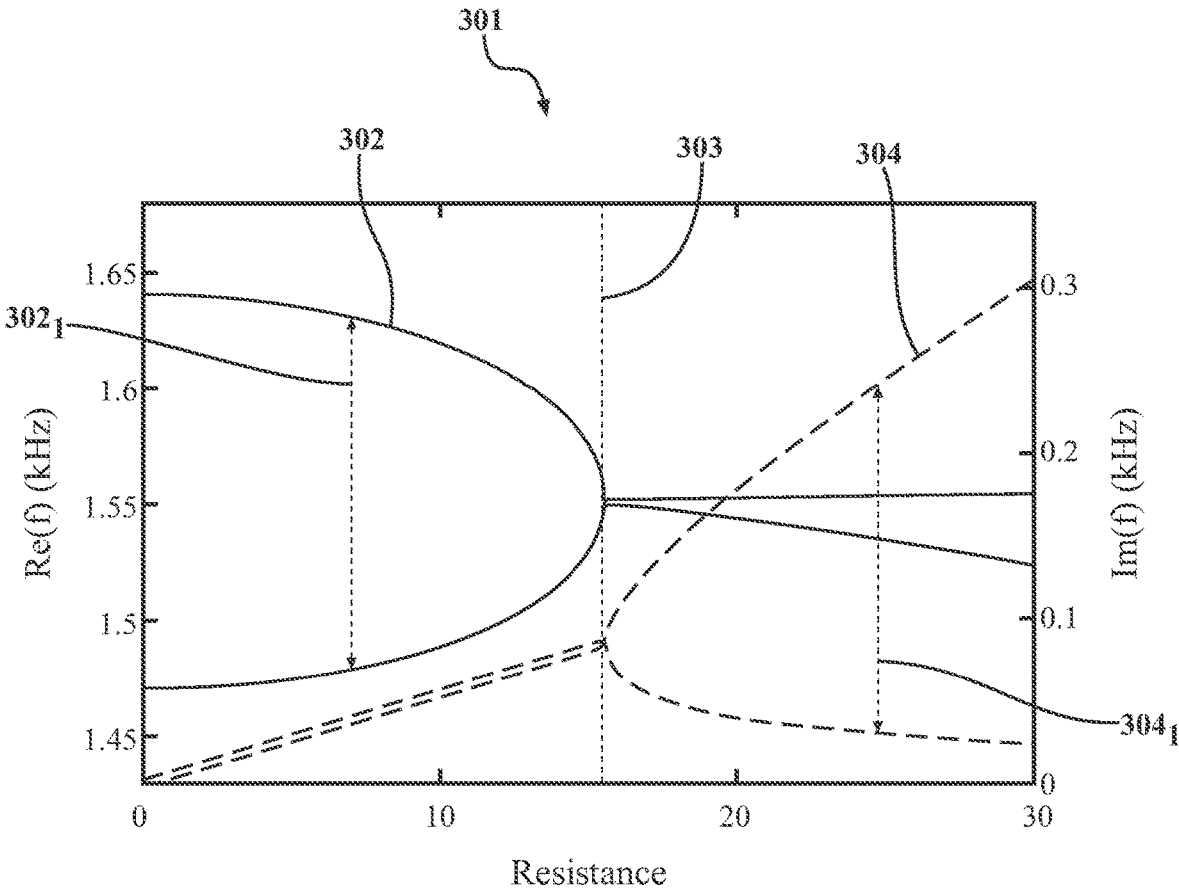
FIG. 3 illustrates an example of a system following a square-root model for the mechanical resonator to detect an EP through the electrical resonator associated with a perturbation.

In various implementations, FIG. 3 illustrates an example of a system following a square-root model for the mechanical resonator to detect an EP through the electrical resonator associated with a perturbation. FIG. 3 illustrates in graph 301 real and imaginary eigenfrequencies at various resistances having a substantially fixed inductance for the LR-circuit 106. The real graph 302 and imaginary graph 304 may represent eigenstates of the mechanical resonator at the corresponding frequencies. Here, a mechanical resonator can be involved with various vibration modes, perturbations, stresses, and so on while having the EP 303. For example, the beam 102 is bent up or down for decreased resistance values while the beam is substantially stable for increased resistances. As illustrated in real graph 302, a mode in the lower branch may become motionless relative to the upper branch after passing the EP 303 during increased resistances and the beam 102 is stable. As further explained below, the frequency splitting (δf) (e.g., peak splitting) from a resistance change ($\delta R$) in a material (e.g., a pressure change, a crack, etc.) at the vicinity of the EP ($R_{EP}$) may have a square-root topology and follow $\delta f \propto (R - R_{EP})^{1/2}$. Furthermore, decreasing the resistance for the LR-circuit 106 causes a frequency split or detuning represented by the real-frequency distance $302_1$. Similarly, increasing the resistance for the LR-circuit 106 causes a frequency split or detuning represented by the imaginary-frequency distance $304_1$. Accordingly, the system 100 has an EP at 303 where the peaks for the real-frequency distance $302_1$ and the imaginary-frequency distance $304_1$ merge.

Moreover, the system 100 may be associated with a frequency response function (FRF) at various resistances after exciting the beam 102. At minimal resistance values (e.g., $R < R_{EP}$), the frequency response may have multiple (e.g., two) peak responses. Gradually, peak responses coalesce and merge at an EP as the resistance of the LR-circuit 106 adjusts. Furthermore, the measured responses and peaks gradually decrease from the increased damping and electro-mechanical coupling of the system 100. Accordingly, the EP of the system 100 can be reliably detected using FRF and exhibits favorable operating characteristics.

Returning to FIG. 1B, a multiple-patch system 108 having a mechanical resonator that is shunted by an electrical resonator for EP operation and adapted gain is illustrated. Here, the multiple-patch system 108 may mitigate a decrease in mechanical response from excessive (e.g., intrinsic) damping associated with mechanical resonators. In particular, an additional patch (e.g., a piezoelectric material) 110 may be coupled to a negative resistor ($R_o$) 112 for increasing the mechanical response. The $R_o$ 112 can cancel or counter the excessive damping in the mechanical resonator or balance the loss in electrical resonance. Furthermore, the multiple-patch system 108 can operate as a symmetric system by further increasing $R_o$ 112 where imaginary eigenfrequencies are approximately zero before an EP. In one approach, the beam 102 has varying shape and boundary conditions for improving system performance near the EP. For example, the mechanical resonator could be substantially fixed at both or one end. Accordingly, the multiple-patch system 108 improves the mechanical response of the beam 102 by canceling excessive damping and adapting boundary conditions for EP detection.

In various implementations, identifying the EP of the system 100 involves non-Hermitian Hamiltonian and parameter space analysis (e.g., a scattering matrix). A non-Hermitian Hamiltonian involves an open system having complex eigenvalues that leads to an eigenvalue or spectral topology exploitable for favorable characteristics. Here, the system 100 supports non-Hermitian degeneracy such as EP by simply varying parameters (e.g., inductance resistance, etc.), thereby reducing implementation complexity. The EP may represent an operating point of the beam 102 with improved sensitivity even with degradations from spectral distortions. As explained below, an EP may be a point where eigenvalues, eigenstates, eigenvectors, and so on coalesce. This favorably leads to unidirectional reflectionlessness (e.g., near-zero reflection), unidirectional behaviors, robust absorption, enhanced higher-order sensitivities, and so on. Furthermore, the system 100 can also estimate the EP using a square-root dependence on the external perturbation related to the nominal resistance. In this way, the system 100 achieves improved spectral characteristics and a response without increasing implementation complexity.

Moreover, the system 100 may use piezoelectric shunting for additional degrees-of-freedom (DOF) in materials (e.g., elastic materials, acoustic materials, etc.) applications and real-time tuning. In this way, the system 100 has improved robustness through broader bandwidth with the piezoelectric shunting. For example, the patch 104 uses a piezoelectric material in LR-circuit 106 to shunt the mechanical resonator, causing improved performance of low-frequency and broadband energy (e.g., vibration energy, external stimuli) harvesting. The performance is particularly enhanced at the EP of the system 100 for these configurations.

Now turning to analysis details of the system 100, eigenfrequency analysis may be modeled for EP detection as follows. In the forthcoming example, the beam 102 is elastic and the patch 104 is a piezoelectric material coupling the LR-circuit 106 and the mechanical resonator for external shunting. For simplicity, one DOF (e.g., the fundamental mode) characterizes the mechanical resonance of the beam 102. Here, the mechanical resonator can include a lumped mass ($m_1$), spring ($k_1$), damper ($c_1$) model with an external shunted impedance (Z) and a base excitation (v). The motion equations of the shunted resonator can be expressed as:

$$m_1 \ddot{q} + c_1(\dot{q} - \dot{v}) + k_1(q - v) + gQ = 0, \qquad \text{Equation 1(a)}$$

$$k_2 Q + gq = V_a. \qquad \text{Equation 1(b)}$$

Here, q is the mass displacement, $V_a$ is the voltage across the patch 104, Q is the electrical charge flow in the circuit, $k_2$ is the inverse capacitance of the patch 104, and g indicates the electro-mechanical coupling coefficient. Furthermore, we have $g = \xi \sqrt{k_1 k_2}$, where $\xi$ is the generalized electro-mechanical coupling coefficient factoring the energy transfer of the patch 104. This coefficient can be found experimentally by measuring mechanical resonances with open and short circuits.

Moreover, if the patch 104 is connected to the LR-circuit 106 in series, Kirchhoff's voltage law provides that:

$$V_a = -L\ddot{Q} - R\dot{Q}. \qquad \text{Equation (2)}$$

The system of equations then becomes:

$$m_1 \ddot{q} + c_1(\dot{q} - \dot{v}) + k_1(q - v) + gQ = 0, \qquad \text{Equation 3(a)}$$

$$L\ddot{Q} + R\dot{Q} + k_2 Q + gq = 0. \qquad \text{Equation 3(b)}$$

This can be written in a matrix form, dropping the excitation terms from the host structure as:

$$M\ddot{y} + C\dot{y} + Ky = 0, \qquad \text{Equation (4)}$$

where $$M = \begin{bmatrix} m_1 & \\ & L \end{bmatrix}, C = \begin{bmatrix} c_1 & \\ & R \end{bmatrix}, K = \begin{bmatrix} k_l & g \\ g & k_2 \end{bmatrix}, \text{ and } y = \begin{bmatrix} q \\ Q \end{bmatrix}. \qquad \text{Equation (5)}$$

For reaching a solution, a quadratic eigenvalue problem (QEP) can be found by assuming a fundamental solution of $y(t) = Ye^{\lambda t}$, which reads:

$$[M\lambda^2 + C\lambda + K]Y = 0. \qquad \text{Equation (6)}$$

The complex eigenfrequencies $$f = -\frac{i\lambda}{2}\frac{}{\pi}$$ 5 of the system can be found by solving the QEP. As previously explained, damping induced by shunted resistors on materials can affect the performance of the system 100. In one approach, higher resistance of the LR-circuit 106 broadens the frequency range at the cost of reducing attenuation. As given below, the system 100 can adapt for resistance variations in non-Hermitian systems that are detrimental.

In various implementations, the governing equation for the LR-circuit 106 configured as a resonator may be:

$$\ddot{y} = -Dy + \Gamma\dot{y},$$ Equation (7)

where $D = M^{-1} K$ and $\Gamma = -M^{-1} C$. Here, the first and second terms describe the potential force and the force proportional to the velocity. This second-order differential equation may be expressed using first-order differential equations by introducing additional variables, i.e., $\overline{Y} = [y,\dot{y}]^T$. This variable can be further written as:

$$\frac{d}{dt}\begin{bmatrix} y \\ \dot{y} \end{bmatrix} = \begin{bmatrix} 0 & I \\ -D & \Gamma \end{bmatrix}\begin{bmatrix} y \\ \dot{y} \end{bmatrix}.$$ Equation (8)

Based on the transformation:

$$\Psi = \begin{bmatrix} \sqrt{D} & 0 \\ 0 & iI \end{bmatrix}\overline{Y},$$ Equation (9)

the set of first-order differential equations may be:

$$i\frac{d}{dt}\Psi = H\Psi,$$ Equation (10)

which is reformulated as a Schrodinger equation. In this configuration, the Hamiltonian can be defined as:

$$H = \begin{bmatrix} 0 & \sqrt{D} \\ \sqrt{D} & i\Gamma \end{bmatrix}.$$ Equation (11)

In the system 100, the eigenvalues of the mechanical resonator may be derived from the Hamiltonian with minimal complexity. Additionally, characterizing an EP of the system 100 can involve estimating phase rigidity of the eigenstates. As a byproduct and further enhancement, the phase rigidity of the system 100 is reduced during EP operation. Furthermore, the Hamiltonian can be non-Hermitian from the dissipative terms induced by the mechanical or electrical resonators. As such, the left and right eigenstates are generally not identical and satisfy:

$$H\Psi^R = \omega\Psi^R, \ \Psi^L H = \omega\Psi^L,$$ Equation (12)

where $\Psi^R$ and $\Psi^L$ are the right and left eigenstates, respectively. Through a normalization process for the eigenstates, the phase rigidity is defined as $$r_j = \frac{1}{\langle\Psi_j|\Psi_j\rangle},$$ Equation (13)

where the subscript j is the j-th eigenstate, and the operator, $\langle\bullet|\bullet\rangle$, is the scalar dot product of the two states. At the EP, eigenvalues (e.g., real and imaginary parts) coalesce and corresponding eigenvectors may become substantially parallel. Accordingly, the system 100 has improved spectral characteristics without increasing implementation complexity.

Moreover, identifying the EP involves analyzing the coalescing of the eigenvalues and the eigenstates. For example, the system 100 analyzes the absolute value of phase rigidity at each state for measuring the mixing of different states, such as using the right eigenstates, $\Psi^R$. The phase transition at the EP can be characterized by identifying the phase rigidity of states. For instance, the phase rigidity approaches unity when the states are distinct. However, the phase rigidity may dissipate if the two states are completely mixed at the EP.

Regarding additional analysis, the system 100 operating at an EP may involve analysis in the parameter space by varying the resistance and inductance values of the LR-circuit 106. For the analysis, the values at the EP may be $R = R_{EP}$ and $L = L_{EP}$, respectively. For example, FIG. 2A illustrates two real positive eigensurfaces observed for $R < R_{EP}$ with different inductive values. The eigensurfaces have two peaks and the system 100 can tune the LR-circuit 106 til the peaks merge at the EP. Similarly, the imaginary eigensurfaces in FIG. 2B have substantially overlapping areas. The system 100 can observe the imaginary eigensurfaces by further increasing the resistive value (i.e., $R > R_{EP}$). In this configuration, one eigensurface increased while the other approached zero as the resistive value increased. However, the changes of the real eigenfrequencies with the inductive value may behave differently. When $L < L_{EP}$, the two eigensurfaces can cross at a certain resistance value, but the two eigensurfaces do not intersect for $L > L_{EP}$. Accordingly, EP dependence on both resistive and inductive values contribute to the electrical resonance and effect coalescing convergence.

Moreover, the system 100 comparing the mechanical and electrical resonant relationship to eigenfrequencies improves EP detection. For example, two real eigenfrequency branches may not converge when the mechanical resonance $$f_m = \frac{\sqrt{k_1/m_1}}{2\pi}$$

is greater than the electrical resonance $$f_e = \frac{\sqrt{k_{2/L}}}{2\pi}$$

because attenuation on the lower branch of the real eigenfrequency decreases to zero as the resistance increases. In other words, the two eigenstates do not switch. However, the system can reduce the mechanical resonance $f_m$ relative to the electrical resonance $f_e$ with a reduction of L. In this way, the electrical resonance attenuates more on the higher branch of the real eigenfrequency, thereby bringing the higher branch to a lower frequency. The two branches can meet each other at the diabolic point (DP) instead of the EP with the eigenstates switching. Furthermore, in one approach, the system 100 utilizes frequency detuning (e.g., $f_e > f_m$) that adapts to improve EP observation.

In various implementations, the phase rigidity of the system 100 may approach zero when the eigenstates become defective at the EP. A physical consequence of the EP is enhanced sensitivity to parameter changes. In response, the system 100 can verify that the frequency detuning ($\delta f$) induced by a resistance change ($\delta R$) at the vicinity of the EP ($R_{EP}$) has a square-root relation with a small disturbance of the resistance $\delta f \propto (R - R_{EP})^{1/2}$, owing to the square-root relationship near the second-order EPs. In this way, the system 100 can robustly function as a sensor, waveguide, and so on with enhanced sensitivity in non-linear applications, including lossy environments and phase distortions.

As previously explained, the system 100 can factor mechanical damping for improving robustness. For example, $C_{crt}$ is the critical damping of the mechanical resonator defined as $C_{crt} = 2\sqrt{k_1 m_1}$. With different amounts of mechanical damping added to the system, even though the shapes of the eigenfrequencies vary, the system 100 finds the EP with mechanical damping. However, as explained below, the increased electrical resistance may also increase mechanical damping impacting performance.

In one approach, the system 100 implements a coupled mode model near the EP. For example, a second-order coupled mode model describes effects near the EP for the system 100. Here, the 2×2 non-Hermitian Hamiltonian can be expressed as:

$$\overline{H} = \begin{bmatrix} i\gamma_m + \omega_m & \kappa, \\ \kappa & i\gamma_e + \omega_e \end{bmatrix}, \qquad \text{Equation (14)}$$

where $\gamma_m = \frac{1}{2}\frac{c_1}{m_1}$, $\gamma_e = \frac{1}{2}\frac{R}{L}$, $\omega_m = \sqrt{k_1/m_1}$, $$\omega_e = \sqrt{k_2/L}, \text{ and } \kappa = \sqrt{\kappa_{12}\kappa_{21}} = \frac{1}{2}\frac{g}{\sqrt{Lm\omega_m\omega_e}}.$$

Furthermore, $$\kappa_{12} = \frac{1}{2}\frac{g}{m\,\omega_m} \text{ and } \kappa_{21} = \frac{1}{2}\frac{g}{L\,\omega_e}.$$

Due to weak coupling between modes, i.e., $\omega_m \gg \kappa$, $\gamma_e$ and $\omega_e \gg \kappa$, $\gamma_e$, the coupled mode model validates for the system 100.

Assuming $|\omega_m - \omega_e| \ll \kappa$, $\gamma_e$ and $\omega_m = \omega_e$, the EP with coincided eigenvalues can be found from the Hamiltonian by satisfying:

$$|\gamma_e - \gamma_m| = 2\kappa, \qquad \text{Equation (15)}$$

which is further explicitly expressed as:

$$\left|\frac{R}{L} - \frac{c_1}{m}\right| = 2\frac{g}{\sqrt{Lm\omega_m\omega_e}} = 2g\sqrt{\frac{\omega_m\omega_e}{k_1k_2}} = 2\xi\sqrt{\omega_m\omega_e}. \qquad \text{Equation (16)}$$

This indicates that the unbalanced losses in the two resonators are fixable by leveraging coupling strength and natural resonances. Exploiting the flexibility of the LR-circuit 106, the system 100 having $R/L > c_1/m_1$ corresponds to a target EP. Thus, the estimated resistive value at the EP is:

$$\overline{R}_{EP} = \frac{L}{m}c_1 + 2L\xi\sqrt{\omega_m\omega_e}. \qquad \text{Equation (17)}$$

Equation (17) illustrates that resistance for an EP increases with a scale of L/m as the mechanical damping coefficient, $c_1$, is increased for a given coupling strength. However, as previously discussed, the electrical resonance being more than the mechanical resonance may result in improved performance of the system 100. Therefore, the target inductive value can decrease as the mechanical damping increases. If there is no mechanical damping ($c_1 = 0$), the resistance at the EP is otherwise simplified as:

$$\overline{R}_{EP} = 2L\xi\sqrt{\omega_m\omega_e}. \qquad \text{Equation (18)}$$

Figure 4A:
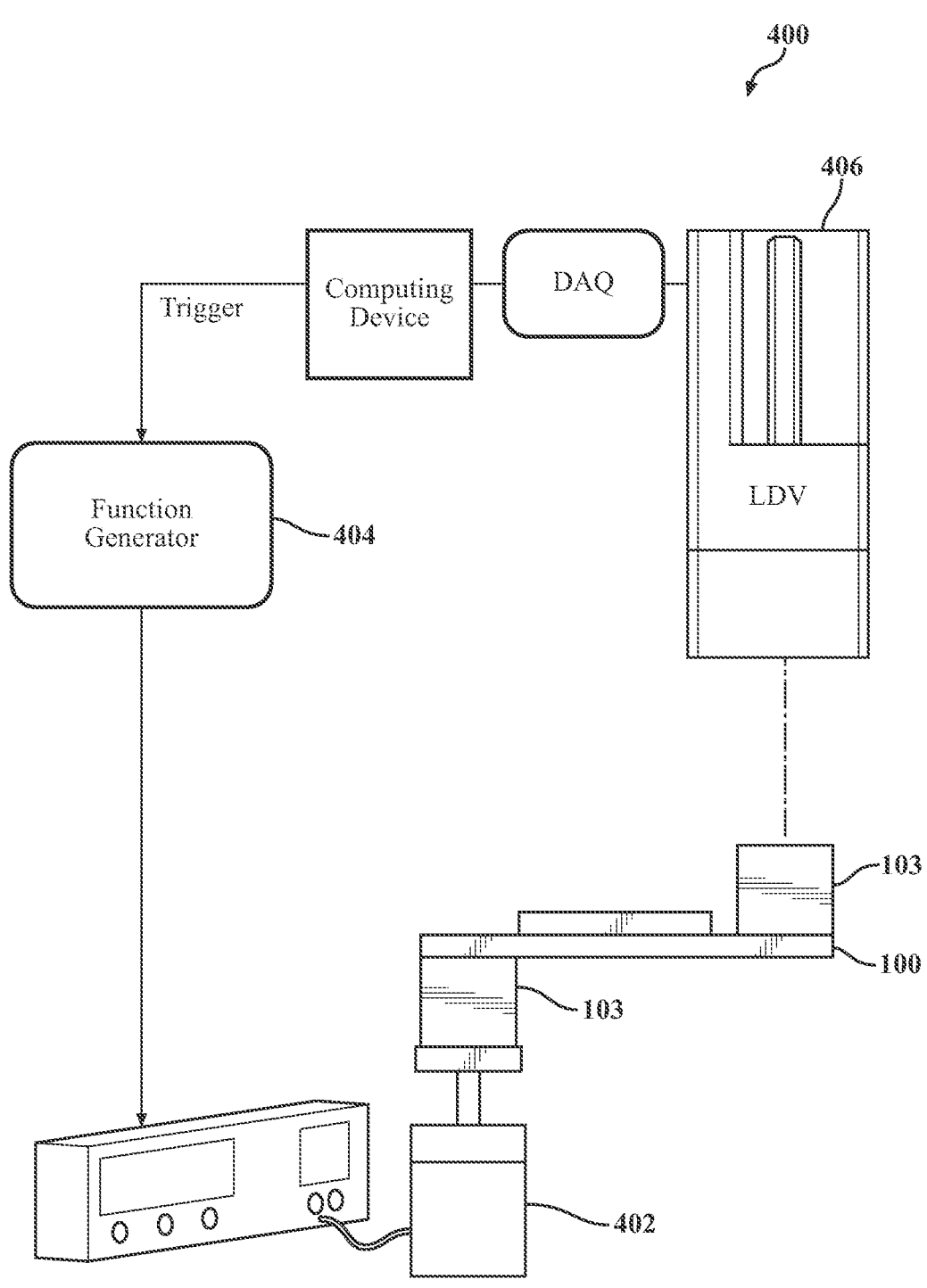
FIGS. 4A and 4B illustrate examples of a mechanical resonator proximate to a body and shunted through an electrical resonator for EP detection associated with a perturbation.
Figure 4B:
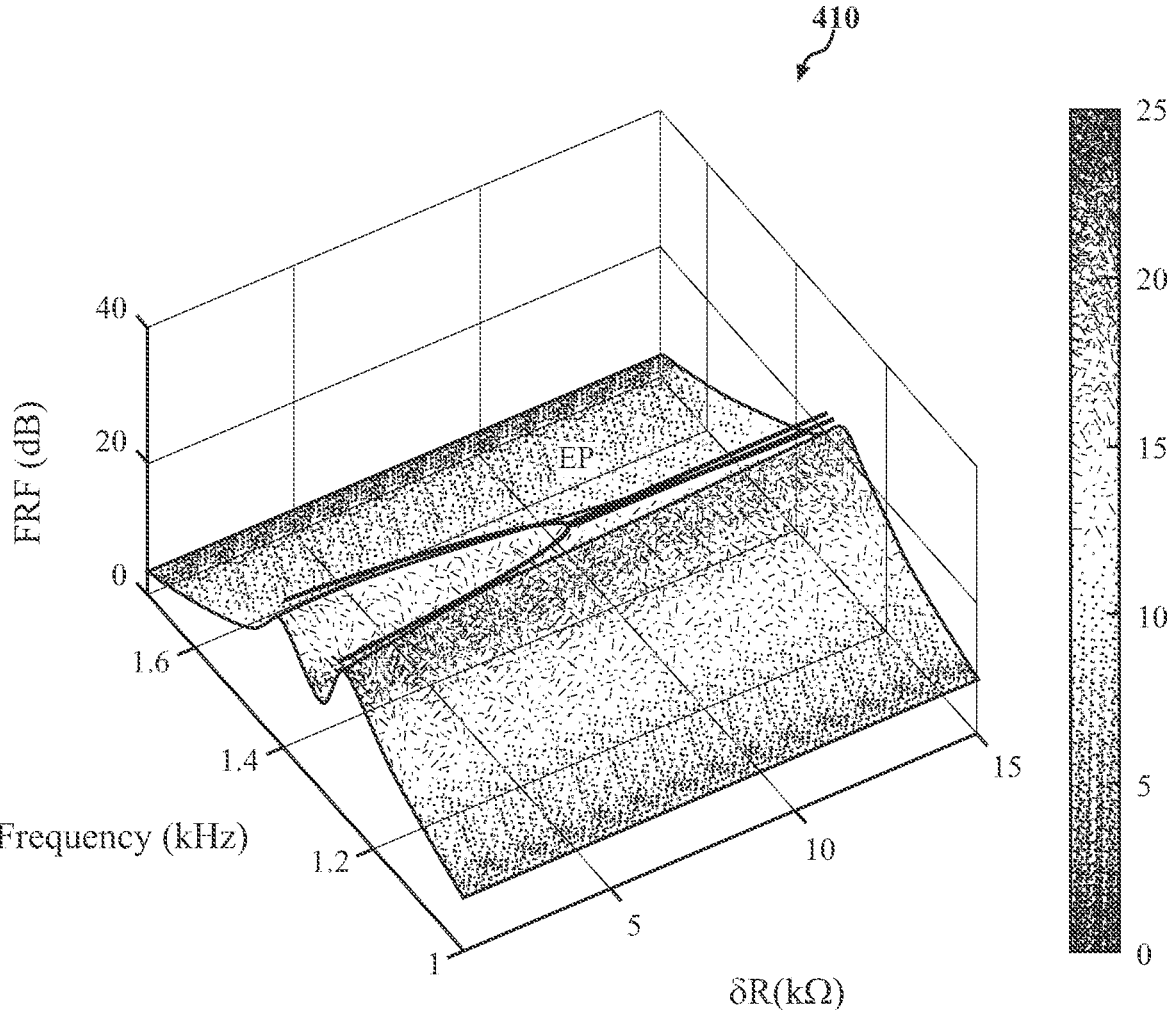

Turning now to FIGS. 4A and 4B, examples of a mechanical resonator proximate to a body and shunted by an electrical resonator for the EP detection associated with a perturbation are illustrated in FIGS. 4A and 4B. Here, the system 100 has the body structures 103 as masses in a cantilever arrangement within the configuration 400. One body structure functions as a tip mass and the other as a host structure. A piezoelectric patch is bonded to the system 100 for integrating the LR-circuit 106 (not shown in FIG. 4A). A shaker 402 is driven by a function generator 404 via a power amplifier for causing a perturbation or excitation upon the system 100. Furthermore, the configuration 400 can be reduced (e.g., sub-micron) using micro-electro-mechanical (MEMS) fabrication for improved sensor or waveguide applications.

Regarding the EP detection, a laser Doppler vibrometer (LDV) 406 or displacement/accelerometer sensor measures the velocity response of the body structures 103. A computing device acquires data from the data acquisition (DAQ) device associated with measurements of the LDV 406. Furthermore, the computing device triggers additional perturbations by controlling the function generator 404. In this way, the system 100 derives the frequency response and identifies the EP by varying perturbations and values of the LR-circuit 106.

Moreover, FIG. 4B illustrates the FRF 410 of the system 100 for the configuration 400 having added resistance $\delta R$. At minimal resistance values, i.e., $\delta R < \delta R_{EP}$, two peak responses appear. Gradually, the two peak responses decreased and merged together at the EP, $\delta R = \delta R_{EP}$, as the resistance increased. Furthermore, due to damping of the mechanical resonator during the fabrication, the resonator response was lower than that without considering the intrinsic loss in the mechanical resonator. Similar to previous examples, the frequency splitting in the vicinity of the EP scaled as $\delta f \propto \sqrt{1 - \delta R/\delta R_{EP}}$. Accordingly, the system 100 couples mechanical and electrical resonators for tuning to identify and observe the EP, thereby improving measurements and excitation performance for various applications.

Figure 5A:
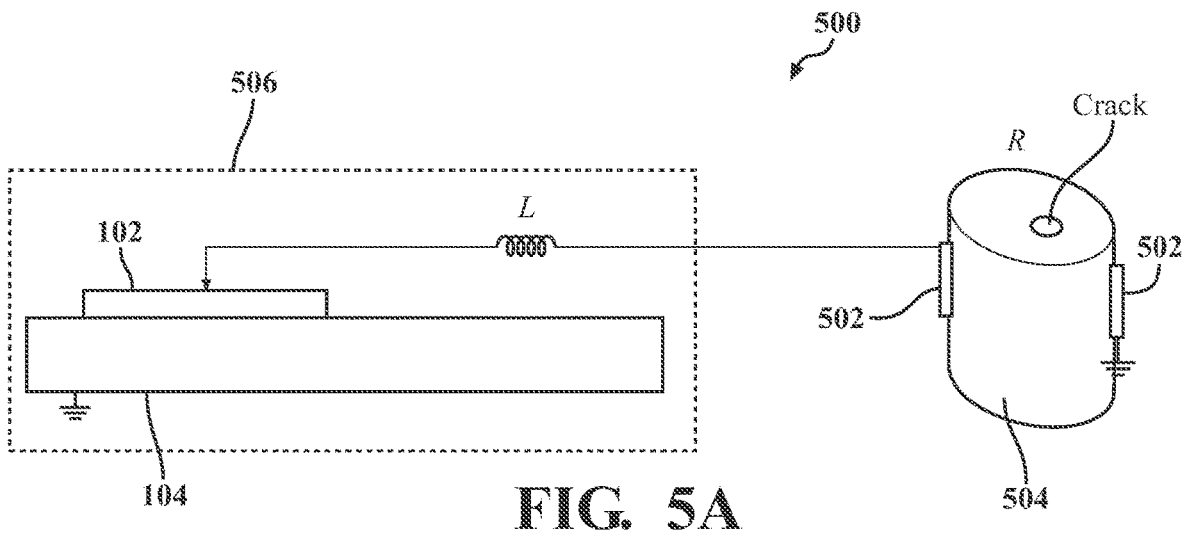
FIGS. 5A and 5B illustrate an example of a mechanical resonator shunted through an electrical resonator for crack sensing using EP operation and measurements.
Figure 5B:
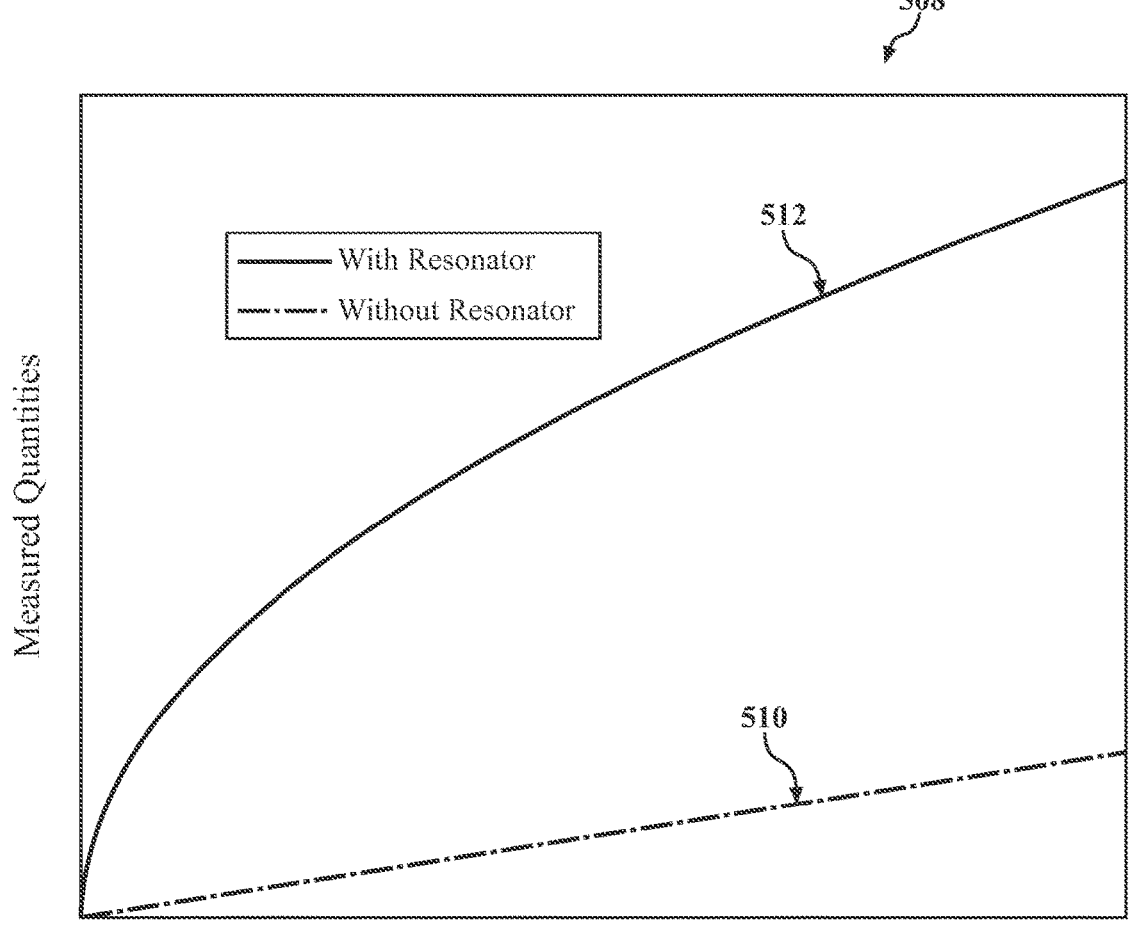

Now turning to FIGS. 5A and 5B, an example of a mechanical resonator shunted through an electrical resonator in sensor 500 for crack sensing using EP operation and measurements is illustrated. As previously explained, the system 100 can measure host temperature where the values of resistor R reflect host temperature. Similarly, the sensor 500 can be used in tomography systems for visualizing and reconstructing cracks or damage regarding a rigid structure 504 (e.g., concrete) through resistance changes. In one approach, the sensor 500 uses electrodes 502 to measure a boundary voltage of the rigid structure 504 through current or voltage applied to the surface. In particular, the system 100 enhances the sensitivity of the measured resistance with the EP from the electrical-mechanically coupled resonances, thereby improving health monitoring of the rigid structure.

In various implementations, an electrode 502 is coupled to the inductor forming a micro-resonator 506 (e.g., a MEMS device) and the other electrode 502 is connected to ground. A vibration source may excite the micro-resonator 506 for observing the peak response. As previously explained, the peak splitting frequency of the micro-resonator 506 may exhibit a square root dependence $\delta f = \sqrt{1-R/R_{EP}}$ for measured resistance near the EP. FIG. 5B illustrates chart 508 having a linear profile 510 involving a direct measurement for impedance (Y-axis) from an electrical resonator without the micro-resonator 506 for changing resistances or impedance. Graph 512 exhibits a square-root dependence of frequency splitting (Y-axis) for the sensor 500 by indirect measurements of the micro-resonator 506. Furthermore, the frequency splitting in eigenfrequencies exhibits properties similar to graph 301. Accordingly, the micro-resonator 506 enhances the sensitivity of the measured resistance through non-linear properties and modeling, thereby improving crack detection and tomography.

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a mechanical resonator having a beam coupled to a body;
an electrical resonator coupled through a patch to the mechanical resonator, the electrical resonator operating as a shunt and having an inductor and a resistor that form an LR circuit in series; and
the electrical resonator detects a signal caused by a perturbation of the body and a processor is configured to compute an exceptional point (EP) of the mechanical resonator by varying the LR circuit according to a model, and the EP represents an intersection of eigen parameters associated with values of the inductor and the resistor.

2. The system of claim 1 further comprising the electrical resonator causes tuning to the EP using the model, wherein the model follows a square-root dependence on a resistance of the resistor from the electrical resonator, and the square-root dependence is associated with the perturbation and a splitting frequency.

3. The system of claim 2, wherein the EP represents an intersection and coalescence of the eigen parameters, and the eigen parameters include eigenfrequencies and eigenvalues associated with the values of the inductor and the resistor.

4. The system of claim 2, wherein a peak of the splitting frequency is derived from the square-root dependence and the splitting frequency represents a frequency response of the mechanical resonator associated with the perturbation that is resistance.

5. The system of claim 4, wherein the splitting frequency is associated with scaling as a square-root of a strength associated with the perturbation.

6. The system of claim 5, wherein the values are correlated with a temperature or a crack associated with the electrical resonator.

7. The system of claim 2 further comprising the electrical resonator measures resistance values for the resistance at the EP.

8. The system of claim 1, wherein the model is a complex-square-root function that derives the EP associated with the perturbation of the mechanical resonator and the perturbation causes frequency splitting of a frequency response.

9. The system of claim 1, wherein the mechanical resonator and the electrical resonator are associated with one of a sensor, an ultrasonic sensor, and a waveguide.

10. The system of claim 1, wherein the patch is a piezoelectric material and the EP is associated with the perturbation of a shunting impedance.

11. The system of claim 1, wherein the beam is one of an elastic material, aluminum, a micro-structure resonator, and a nano-structure resonator.

12. A system comprising:
a mechanical resonator having a flexible beam coupled to a body;
an electrical resonator coupled through a patch to the mechanical resonator, the electrical resonator shunting the mechanical resonator and having an inductor and a resistor that form an LR circuit in series; and
the electrical resonator controls frequency detuning near an exceptional point (EP) of the mechanical resonator by controlling the LR circuit according to a model using a signal, and the EP represents an intersection of eigen parameters associated with values of the inductor and the resistor.

13. The system of claim 12 further comprising the electrical resonator causes tuning to the EP using the model, wherein the model follows a square-root dependence for a resistance of the resistor from the electrical resonator, and the square-root dependence is associated a splitting frequency.

14. The system of claim 13, wherein the EP represents a crossing of eigenfrequencies associated with the values of the inductor and the resistor, and the eigen parameters include the eigenfrequencies.

15. The system of claim 13, wherein a peak of the splitting frequency is derived from the square-root dependence and the splitting frequency represents a frequency response of the mechanical resonator.

16. The system of claim 13 further comprising the electrical resonator measures resistance values for the resistance at the EP.

17. The system of claim 16, wherein the resistance values are correlated with a temperature or a crack from a structure coupled to the electrical resonator.

18. The system of claim 12, wherein the model is a complex-square-root function that derives the EP associated with a perturbation of the mechanical resonator and the perturbation causes frequency splitting of a frequency response.

19. A sensor comprising:
a mechanical resonator having a flexible beam coupled to a body;
an electrical resonator coupled through a piezoelectric device to the mechanical resonator, the electrical resonator shunting the mechanical resonator through an inductor and a resistor that form an LR circuit in series; and
the electrical resonator is configured to measure, associated with a shock of the body, frequency detuning near an exceptional point (EP) of the mechanical resonator by controlling the LR circuit according to a non-linear model and a signal, and the EP represents an intersection of eigen parameters associated with values of the inductor and the resistor.

20. The sensor of claim 19 further comprising the electrical resonator causes tuning to the EP using the non-linear model, wherein the non-linear model follows a square-root dependence for a resistance of the resistor from the electrical resonator, and the square-root dependence is associated with a splitting frequency.

* * * * *